Nov. 4, 1952  C. E. CRAWFORD  2,616,656
VALVE

Filed Aug. 8, 1946  2 SHEETS—SHEET 1

INVENTOR.
CARLOS E. CRAWFORD
BY Edmund W. C. Kamm
ATTORNEY

Nov. 4, 1952 — C. E. CRAWFORD — 2,616,656
VALVE
Filed Aug. 8, 1946 — 2 SHEETS—SHEET 2
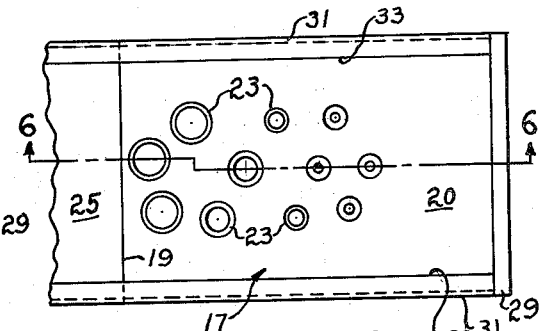
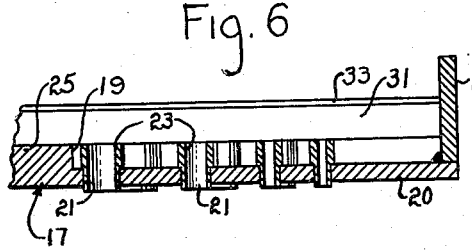
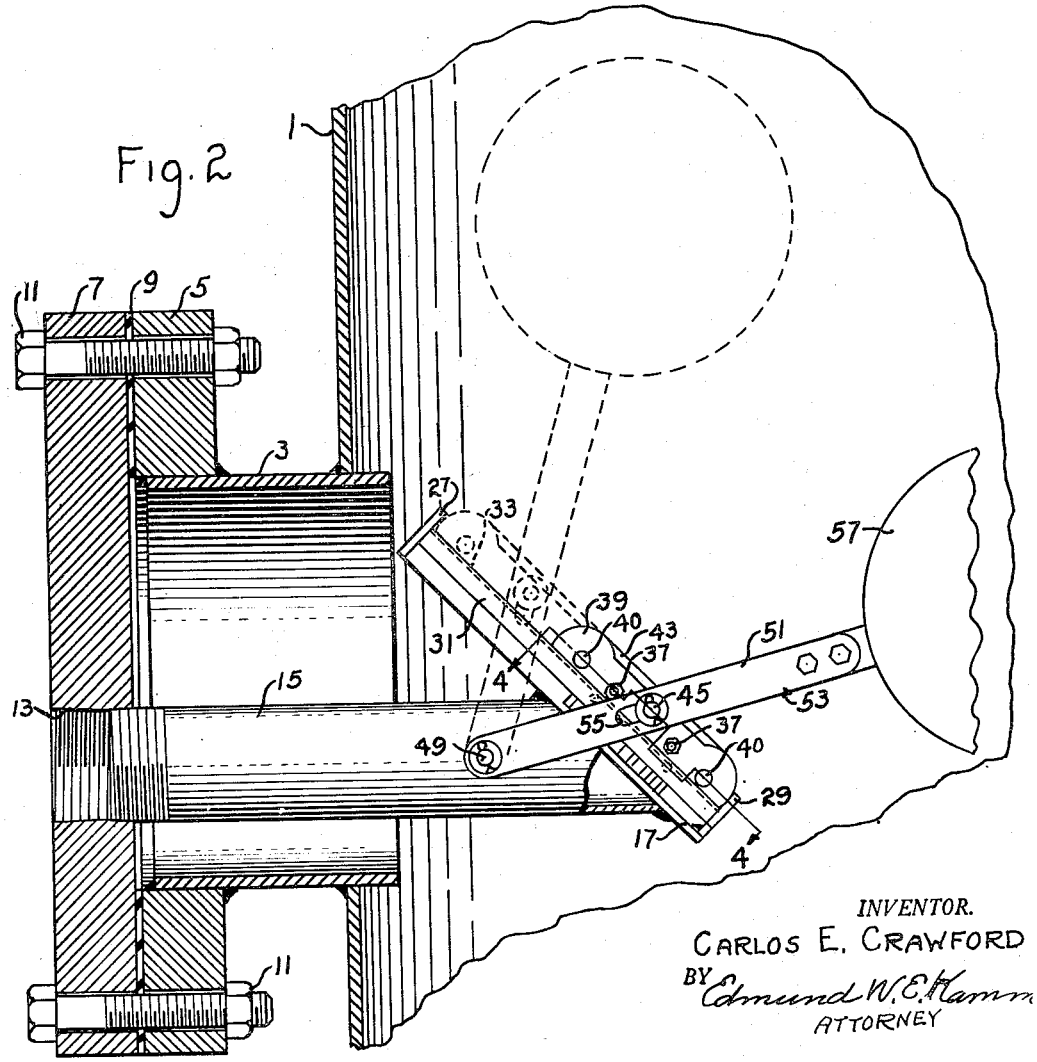
INVENTOR.
CARLOS E. CRAWFORD
BY Edmund W. E. Hamm
ATTORNEY Patented Nov. 4, 1952

2,616,656

UNITED STATES PATENT OFFICE 2,616,656

VALVE

Carlos Everette Crawford, Wichita Falls, Tex.

Application August 8, 1946, Serial No. 689,159

4 Claims. (Cl. 251—53)

This invention relates to a valve which is adapted to control the flow of liquid or gas under pressure and which is openable against pressure. More specifically, it relates to a valve which employs a plurality of small ports which are opened and closed by rolling a belt-shaped flexible valve over them.

It is a well known fact that it is advantageous to use the pressure in a fluid system to hold a valve closed but that this advantage is offset by the difficulty in opening the valve against the pressure. Unless the pressure across the valve is balanced in some way, operation of the valve by a float is precluded.

I have heretofore discovered that by using a flexible valve to control the valve port, and peeling it away from the port progressively, the valve can be opened by means of a float even against relatively high pressure. This structure has been fully set forth in my Patent Number 2,216,000, issued September 24, 1940, for "Automatic Pipe Line Delivery Valve."

The present application has for its object the provision of a different mechanism for peeling the valve away from the ports and for replacing it over the ports.

Another object is to provide a valve mechanism which is capable of guiding and restraining the float in a given path of operation.

Still another object of the invention is to provide a structure for guiding the valve and for retaining it in proper relation to the ports.

Yet another object of the invention is to provide a valve structure which is rugged and long lived.

These and other objects will become apparent from a study of this specification and the drawings which are attached hereto and made a part hereof and in which:

Figure 2 is a side elevation viewed from the bottom of Figure 1 showing the same structure.

Figure 5 is a plan view of the valve ports.

Figure 6 is a section taken on the line 6—6 of Figure 5 showing the ports in elevation.

Figure 1:
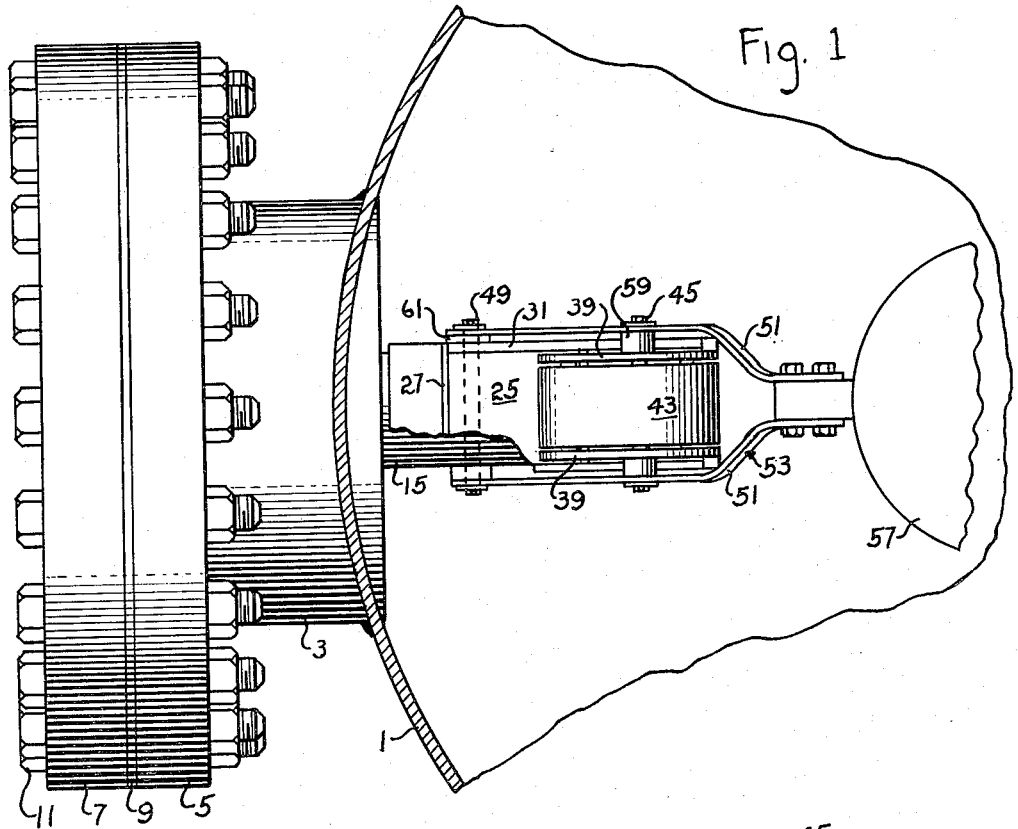
Figure 1 is a plan view of the valve in position in a tank, showing the float and actuating lever.
Figures 3, 4:
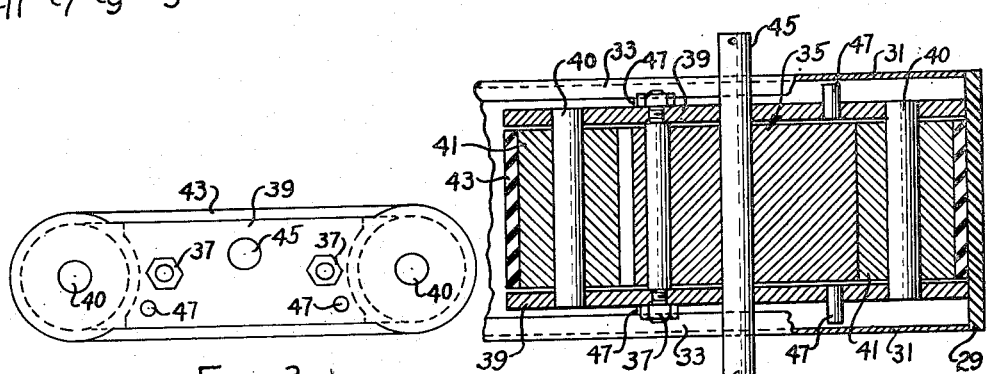
Figure 3 is an elevation of the valve.
Figure 4 is a sectional view of the valve taken substantially on the line 4—4 of Figure 2.

Referring now to Figures 1 and 2, the numeral 1 indicates a pressure tank which has an outlet pipe 3 fitted with a flange 5. A cover plate 7 is held on the flange against a gasket 9 by bolts 11. An opening 13 is formed in the plate and is tapped for pipe in both directions. A discharge pipe (not shown) is screwed into the plate from the outside while the valve supporting pipe or port pipe 15 is screwed into the plate on the inside.

The port pipe has welded, or otherwise fixed to it, a port plate 17 which is preferably inclined to the axis of the pipe. The port plate is stepped, as shown at 19 in Figures 2, 5 and 6, and has a plurality of holes 21 formed in the lower or thinner end 20.

A plurality of port pieces 23 formed as shouldered nipples are frictionally or otherwise held in the holes 21 and the length above the shoulder of each nipple is such that the top is flush with the surface of the thicker portion 25 of the port plate.

Stops 27 and 29 are fixed to the upper and lower ends of the port plate to limit the valve travel. Guide rails 31 are mounted between the stops on each side of the plate and have inwardly directed flanges 33 formed thereon.

The valve comprises a block 35 to the sides of which are attached, as by bolts 37, two similarly formed retaining plates 39 which project beyond the ends of the block. Shafts 40 are rotatably mounted in the projecting ends of the plates and rollers 41 are fixed to the shafts between the plate.

An endless belt 43 of synthetic rubber or other flexible material is mounted to run on said rollers and is confined at its open sides by the projecting ends of the plates which are disposed about flush with the exterior surface of the belt. Thus the belt is guided and held in proper position on the rolls by the plates.

A pin 45 passes laterally through the central portion of the block and through the plates while pins 47 set in plates 39 project under flange 33 of the rails 31.

A pivot pin 49 is fixed in the pipe 15 and is engaged at either end by the arms 51 of a yoke 53. These arms are provided with slots 55 intermediate their ends and these receive the ends of rod 45 of the valve carriage. The upper or free ends of the arms are bent inwardly and fixed to a float 57 in any suitable manner. Suitable cotter pins or other fastenings hold the yoke in place on the pivot pins. Suitable spacers 59 and 61 are provided on the pins to hold the valve centralized with respect to the port plate.

It is obvious, of course, that instead of being float operated the valve may be operated by a solenoid, a lever, a hand wheel, a diaphragm or any other suitable means.

Operation

Assuming that the parts are in the position indicated by full lines in Figure 2, it will be apparent that the belt 43 is disposed in sealing relation over all of the ports, and since the pressure is in the tank, the valve (belt) is pressed down on the nipples. As liquid enters the chamber the float rises and through the yoke, which pivots on pin 49, transmits movement to the carriage.

Pins 47, flanges 33 and slots 55 in arms 51 prevent the carriage from lifting from its seat and it will consequently be moved upwardly in a path parallel to the port plate 17. The valve will be rolled back at the trailing end of the carriage so that the port shown on the extreme right will first open. This is a relatively small port and can be readily opened; and when it is opened, the pressure differential across the valve will be reduced.

As the float rises additional ports are opened, one at a time, and the differential becomes less and less. The ports are therefore made progressively larger from right to left of Figure 5.

As the liquid level falls, the float drops and the carriage will roll downwardly to the right (Fig. 1) and progressively close the ports.

It is obvious that various changes may be made in the form, structure and arrangement of parts without departing from the spirit of the invention. Accordingly, applicant does not desire to be limited to the specific embodiment disclosed herein primarily for purposes of illustration; but instead, he desires protection falling fairly within the scope of the appended claims.

What I claim to be new and desire to protect by Letters Patent of the United States is:

1. In a fluid control valve, the combination of a valve seat, outlet port means defined by said seat, a valve formed as an endless belt, said seat and valve being disposed so that the fluid being controlled will be applied to the valve in a direction to hold the valve against the seat, a carriage comprising a block, rolls mounted on opposite ends thereof for receiving said belt and means connected to the carriage for actuating said carriage to roll said valve on said seat to open and close said port means.

2. In a fluid control valve, the combination of a valve seat, outlet port means defined by said seat, a valve formed as an endless belt, said seat and valve being disposed so that the fluid being controlled will be applied to the valve in a direction to hold the valve against the seat, a carriage comprising a block, rolls mounted on opposite ends thereof for receiving said belt, means on said block for holding said belt on the rolls, and means connected to the carriage for actuating said carriage to roll said valve on said seat to open and close said port means.

3. In a fluid control valve, the combination of a valve seat, outlet port means defined by said seat, a valve formed as an endless belt, said seat and valve being disposed so that the fluid being controlled will be applied to the valve in a direction to hold the valve against the seat, a carriage adapted to support said belt and means comprising a pivotally mounted lever pivotally connected with said carriage for actuating said carriage to roll said valve on said seat to open and close said port means.

4. In a fluid control valve, the combination of a valve seat, outlet port means defined by said seat, a valve formed as an endless belt, said seat and valve being disposed so that the fluid being controlled will be applied to the valve in a direction to hold the valve against the seat, a carriage adapted to support said belt, means comprising a fixed rail on each side of the carriage and rail contacting means on both sides of said carriage, at each end thereof, for holding said valve on said seat and means connected to the carriage for actuating said carriage to roll said valve on said seat to open and close said port means.

CARLOS EVERETTE CRAWFORD.

REFERENCES CITED

The following references are of record in the file of this patent:

UNITED STATES PATENTS

| Number | Name | Date |
|---|---|---|
| 212,556 | Johnson | Feb. 25, 1879 |
| 934,045 | Cotter | Sept. 14, 1909 |
| 1,138,994 | Steele | May 11, 1915 |
| 1,666,908 | Moore | Apr. 24, 1928 |
| 2,112,698 | Hull | Mar. 29, 1938 |
| 2,131,050 | Kinzie | Sept. 27, 1934 |
| 2,180,173 | Share | Nov. 14, 1939 |
| 2,216,000 | Crawford | Sept. 24, 1940 |
| 2,290,461 | Young | July 21, 1942 |
| 2,292,509 | Carson | Aug. 11, 1942 |
| 2,349,368 | Myers | May 23, 1944 |

FOREIGN PATENTS

| Number | Country | Date |
|---|---|---|
| 76,229 | France | of 1867 |